Dec. 18, 1951   C. J. EGAN   2,579,421
FRACTIONAL SOLIDIFICATION PROCESS
Filed April 30, 1949   2 SHEETS—SHEET 2

INVENTOR
Clark J. Egan
by
ATTORNEYS

Patented Dec. 18, 1951

2,579,421

UNITED STATES PATENT OFFICE 2,579,421

FRACTIONAL SOLIDIFICATION PROCESS

Clark J. Egan, Piedmont, Calif., assignor to California Research Corporation, San Francisco, Calif., a corporation of Delaware Application April 30, 1949, Serial No. 90,633

9 Claims. (Cl. 62—124)

The present invention relates to a process for the separation of liquid mixtures by fractional solidification and, more particularly, to a process wherein a plurality of fixed beds of solid heat-exchange material are successively contacted with a liquid feed to separate a solidifiable component therefrom, with a stripping fluid to liquefy and remove the solidified component, and with a refrigerant fluid to cool the heat-exchange material for further use in the feed contacting step.

According to the present invention, a particle-form heat-exchange material such as iron shot or quartz chips is packed in tubular vessels to constitute heat-exchange masses or beds. The heat-exchange material in each vessel is cooled by direct heat exchange with a refrigerating fluid such as brine, liquid ammonia, liquid ethane, liquid or gaseous air, or any other suitable refrigerant, to a temperature sufficiently low to effect solidification of the more readily solidifiable components of the feed. A liquid feed is then passed through the mass of cold heat-exchange material and cooled by direct heat exchange. The more readily solidifiable components of the feed solidify and the solid particles or crystals formed adhere to, and/or are arrested by, the heat-exchange material. The mother liquor effluent from the mass of heat-exchange material is substantially free of suspended solid material. The flow of feed is stopped when the content of the solidifiable components in the mother liquor effluent from the mass of heat-exchange material rises above the desired maximum, thus indicating that the capacity of the mass of heat-exchange material to effect further separation of the feed by solidification is exhausted. A stripping fluid is then passed through the mass of heat-exchange material to liquefy and remove the solid particles or crystals adhering to and lodged in the mass. When the removal of the solid material from the heat-exchange mass is completed, the heat-exchange material is again cooled with the refrigerating fluid.

The steps of contacting the heat-exchange material with the refrigerant, with the feed and with the stripping fluid in sequence, are repeated again and again. However, the several beds of heat-exchange material are not contacted with the same fluid at the same time. Instead, the process is conducted in a cyclic manner such that, simultaneously, certain of the beds are contacted with the liquid feed in a solidifying zone, others with stripping fluid in a solid recovery zone, and the remainder with refrigerant fluid in a cooling zone. Successive cycles are initiated by regrouping the beds in such manner that those exhausted in the solidifying zone, those from which solid material has been completely removed in the solid recovery zone, and those cooled sufficiently in the cooling zone to permit their re-use, are transferred in the succeeding cycle to the solid recovery zone, the cooling zone and the solidifying zone, respectively.

Of the appended drawings.

Since the drawings are diagrammatic only, various pumps, surge drums, etc., which may be advantageously employed have been omitted. Requirements of such auxiliary equipment for a particular separation may readily be supplied by those skilled in the art.

Figure 1:
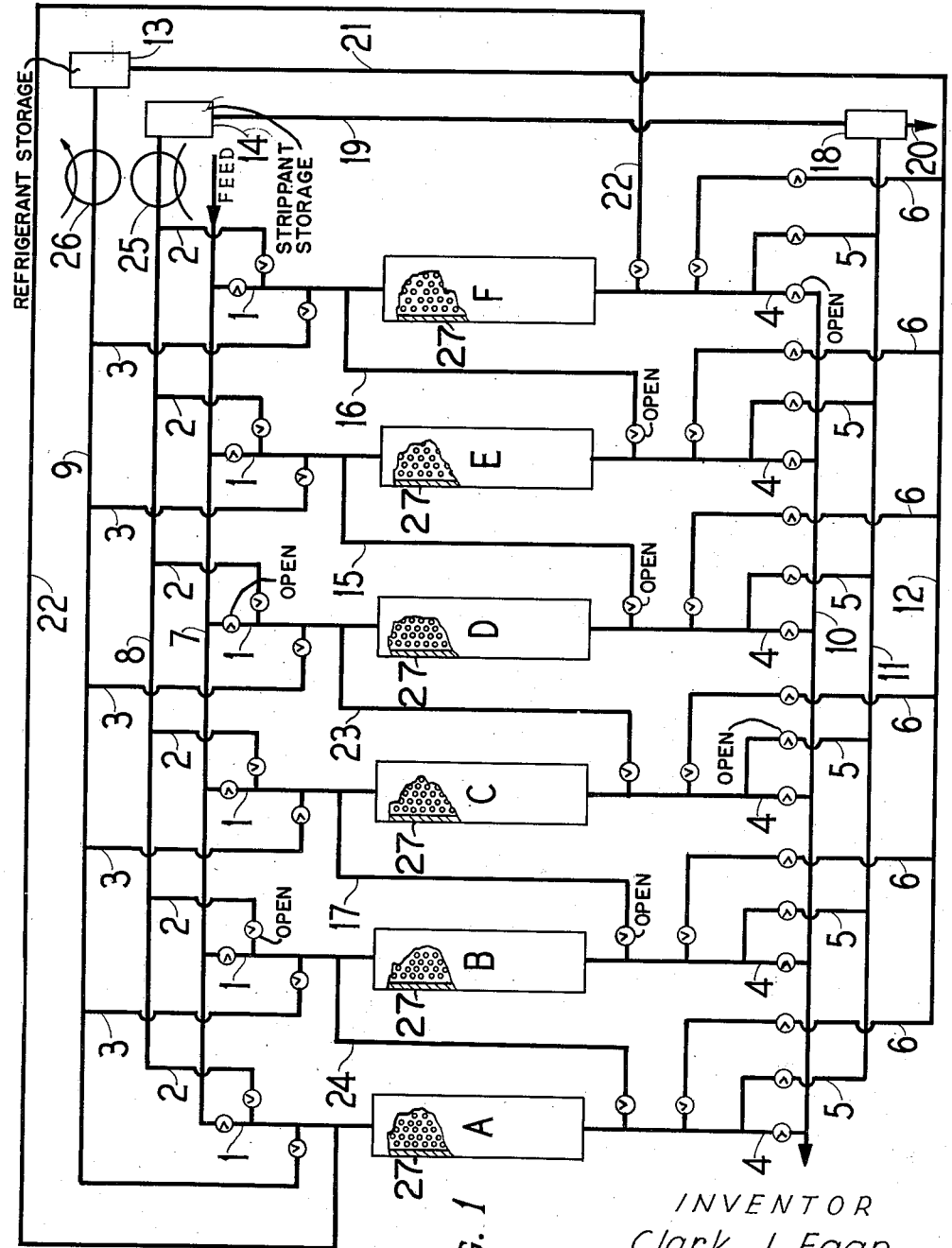
Fig. 1 is a diagrammatic illustration of an arrangement of apparatus and process flow suitable for the practice of the invention.

Referring now to Fig. 1, each of the letters A to F, inclusive, indicates a vessel packed with heat-exchange material such as iron shot. Each vessel is connected by a valved line 1 to feed inlet manifold 7, by valved line 2 to stripping fluid inlet manifold 8, by valved line 3 to refrigerant inlet manifold 9. Each vessel is connected at the bottom by valved line 4 to mother liquor manifold 10, by valved line 5 to solid recovery manifold 11, and by valved line 6 to refrigerant return manifold 12. Refrigerant is stored in tank 13, and stripping fluid in tank 14.

In the latter part of a typical cycle of operation, during which cycle the open valves are indicated as "open" and the valves not so indicated are closed, the process flow would be as follows: The feed liquid is introduced into feed manifold 7 and flows through valved line 1 at vessel D into vessel D, through valved line 15 into vessel E and through valved line 16 into vessel F. The heat-exchange material in the vessels D, E, and F, which constitute the solidification zone, is sufficiently cold to effect a fractional solidification of the feed, causing solid particles to deposit on and be engaged by the heat-exchange material in these vessels during the passage of the feed through them. The mother liquor flows from vessel F through valved line 4 at vessel F into mother liquor manifold line 10 and may be recovered from line 10 as a product.

Stripping fluid is passed from strippant storage tank 14 through heat exchanger 25 into manifold 8, through valved line 2 at vessel B into vessel B, and through valved line 17 into vessel C. The stripping fluid during its passage through vessels B and C, which constitute the solid recovery zone, liquefies the solid deposited on and engaged by the heat exchange material in these vessels during previous cycles of operation. The stripping fluid, together with the liquefied solid, flows from vessel C through valved line 5 at that vessel into manifold 11 which carries the mixture to separator 18 where separation of the stripping fluid and liquefied solid is effected by suitable means. The stripping fluid is passed from separator 18 through line 19 to strippant storage tank 14 for re-use. The liquefied solid material is removed from separator 18 via line 20 as a product.

The above-described flow pattern may be modified by withdrawing the mixture of stripping fluid and liquefied solid from vessel B instead of from vessel C. If this modification is employed the stripping fluid entering vessel B during the first part of the cycle forces residual stripping fluid and liquefied solid present in vessel B at the conclusion of the preceding cycle through line 17 into vessel C. When this displacement has occurred, valved line 17 is closed and valved line 5 at vessel B is opened and recovery of the mixture of stripping fluid and liquefied solid is made from vessel B during the remainder of the cycle. The mixture displaced into vessel C in this mode of operation resides there during the latter part of the cycle and effects a purification of the solid in vessel C by washing from it such of the less readily solidifiable components of the feed as it may contain.

Refrigerant is passed from storage tank 13 through heat exchanger 26, where it is cooled, into manifold line 9, from which it flows through valve controlled line 3 at vessel A into vessel A. The refrigerant passes through vessel A, which constitutes the cooling zone, in contact with the heat-exchange material therein and flows from vessel A through valve controlled line 6 at that vessel into refrigerant return manifold 12. From manifold 12 the refrigerant flows through line 21 to refrigerant storage tank 13.

The flow of the process liquids is continued in the manner described until the capacity of the heat-exchange material in vessel D to effect further solidification from the feed is exhausted, the solid material in vessel B has been substantially all liquefied and removed, and the heat-exchange material in vessel A has been cooled to the desired temperature. The flow of the liquids may be controlled to achieve a substantially simultaneous realization of these three conditions; their realization marks the end of the cycle of operation.

In initiating the succeeding cycle, at vessel D valved line 1 is closed and at vessel E valved line 1 is opened, at vessel F valved line 4 is closed and valved line 22 is opened, at vessel A valved line 3 is closed, at vessel B valved lines 2 and 17 are closed and valved lines 3 and 5 are opened, at vessel C valved line 5 is closed and valved lines 2 and 23 are opened. By this arrangement of valve settings the residual refrigerant in vessel A at the conclusion of the preceding cycle is forced into refrigerant return manifold 12, residual stripping fluid in vessel B is forced into manifold line 11, and residual feed in vessel D is forced into vessel E. When the residual liquids have been cleared from vessels A, B, and D in this manner, the following valve changes are made: At vessel A valved line 6 is closed and valved line 4 is opened, at vessel B valved line 5 is closed and valved line 6 is opened, at vessel D valved line 15 is closed and valved line 5 is opened. This arrangement is maintained throughout the remainder of the cycle. In this last-described cycle, vessels E, F, and A constitute the solidification zone, vessels C and D constitute the solid recovery zone, and vessel B constitutes the cooling zone. The mixture of solid removing fluid and liquefied solid may optionally be removed from the solid recovery zone via valved line 5 at vessel C, in which case valved line 23 is closed and valved line 5 at vessel D is closed during the latter part of the cycle.

In the cycle of operation first described above, the masses of heat-exchange material in vessels D, E, and F constitute the solidification zone. Mass D has been in the solidification zone during the two preceding cycles of operation and its capacity to effect solidification is partially spent, mass E has been in the solidification zone during the preceding cycle and its capacity to effect solidification is likewise partially spent, though not to as great an extent as that of mass D. Mass F has been in the solid recovery zone and in the cooling zone in the preceding cycles and, at the beginning of the cycle under discussion, has its full capacity to effect solidification. Thus, in the solidification zone, a gradient exists as to capacity to effect solidification with that capacity increasing in the direction of feed flow in the zone. Similarly, a gradient exists with respect to solid deposits existing in the zone; the amount of solid material adhering to and engaged by the heat-exchange material decreasing in the direction of flow in the zone. A temperature gradient also exists within the zone; mass D, having been in contact with the feed stream during two preceding cycles, is warmest, and freshly-refrigerated mass F is coldest. The manner of initiating successive cycles of operation, as above illustrated, by moving the points of fluid introduction and withdrawal in the several masses in each zone to the next adjacent mass in the direction of flow and regrouping the masses in such manner that the terminal masses into which fluid is introduced in the solidification zone, the solid recovery zone, and the cooling zone, in one cycle, become the terminal masses from which fluid is withdrawn in the solid recovery zone, the cooling zone and the solidification zone, respectively, in the first part of the succeeding cycle, serves to maintain these gradient conditions. As successive cycles of operation are conducted in this manner the masses of heat-exchange material describe a relative movement countercurrent to the flow of feed liquid. If the number of heat-exchange masses is large and the cycle time is short, true countercurrent operation is approached by the process of the invention while the heat-exchange material is advantageously maintained in fixed position.

In the solidification zone the particle-form heat-exchange material not only absorbs the heat of solidification, but it also provides a large surface on which solid particles or crystals may form and to which they may adhere, and the massed heat-exchange material in the solidification zone acts as a filter to remove such solid particles as may form in suspension in the feed. The mother liquor effluent from the solidification zone is substantially free of suspended solid particles even where the feed is one which is characterized by the formation of suspended fine solid particles when cooled by conventional indirect heat exchange. This freedom of the mother liquor from suspended solid particles is presumably due to the large surface area and filtering action of the heat-exchange masses. Such suspended solid material as may be carried from the solidification zone into mother liquor manifold line 10 may be filtered from the mother liquor prior to its introduction into storage tanks.

If a liquid feed containing a component solidifiable from it at lower temperature is passed into one end of a long column of cold heat-exchange solid material, solid formation begins in the portion of the column where the feed enters. As the flow of feed is continued, the capacity of the heat-exchange material in the first-contacted portion of the column to effect further solidification becomes exhausted and the incoming feed in contact with this exhausted material is unchanged. The mother liquor flows from the other end of the column. Within the column there exists in the liquid phase a gradient concentration of the solidifiable component. Its concentration is at a maximum in the unchanged feed in contact with the exhausted heat-exchange material and at a minimum in the effluent mother liquor. If, as is the usual practice, the process is designed to separate a mother liquor having a specified maximum content of the solidifiable component, then there is a length of the column in which the concentration of the solidifiable component decreases from its maximum in the unchanged feed to the specified maximum concentration in the mother liquor. This length of column, which may be called the blur, represents the portion of the column in which the desired separation is actually being made. In the remainder of the column no separation is being effected. As the flow of feed into the column is continued, the blur moves along the column toward the outlet and will, if the feed flow is continued, pass out of the column as the capacity of the entire mass of heat-exchange material to effect solidification is exhausted. The length of the blur in any separation is dependent upon several process conditions, including the degree of separation desired to be effected and the feed rate. The blur will be lengthened by increasing the feed rate and also be reducing the maximum amount of the solidifiable component which is permissible in the mother liquor. In any working process a definite blur length is established for any set of operating conditions. This length can be determined by inspections of samples withdrawn along the length of a column of heat-exchange material through which the feed is flowing, or it may be determined by temperature measurements where the temperature-composition relation of the feed is known.

The process of the present invention is advantageously conducted by limiting the length of the path of liquid flow through each individual column or mass of heat-exchange material so that its length is less than that of the blur in the separation to be conducted. Preferably each mass has a length equal to a fraction of the blur, the fraction being the reciprocal of an integer, such as ½, ⅓, ¼, etc. The term, "path of liquid flow," is employed to indicate the linear distance from the inlet to the outlet of a vessel filled with heat-exchange material.

The total number of columns in the solidification zone will be preferably at least one more than the number required to equal the length of the blur. For example, if each column is ½, the blur length there will be at least three columns in the solidification zone; if each column is equal to ⅓ of the blur, there will be at least four columns in the solidification zone, etc. Where there are three columns in the solidification zone, the blur is contained in the first two (the first being the column into which feed is introduced) at the beginning of a cycle. During the cycle mother liquor is withdrawn from the third column, the blur meantime moving in the direction of flow until it has moved into the second and third columns, leaving the first column exhausted. When this condition is reached, a new cycle is commenced, the first column of the solidification zone being shifted into the solid recovery zone as the last column thereof and a freshly refrigerated column is shifted from the cooling zone into the solidification zone as the last column thereof.

In conducting a fractional solidification according to the invention, it is frequently possible to employ the mother liquor as the refrigerating fluid. With certain feed mixtures separation of the solidifiable component is rapid as initial reductions in temperature occur and, as temperature is further reduced, only minor amounts of solid material form. The mother liquor derived from such a feed may be cooled sufficiently to permit its use as the refrigerant without appreciable further solid formation. The use of the mother liquor in this manner is desirable, since it reduces the number of materials employed as process liquids and eliminates any possible problem of separating the refrigerant from the mother liquor at the beginning of a new cycle.

Figure 2:
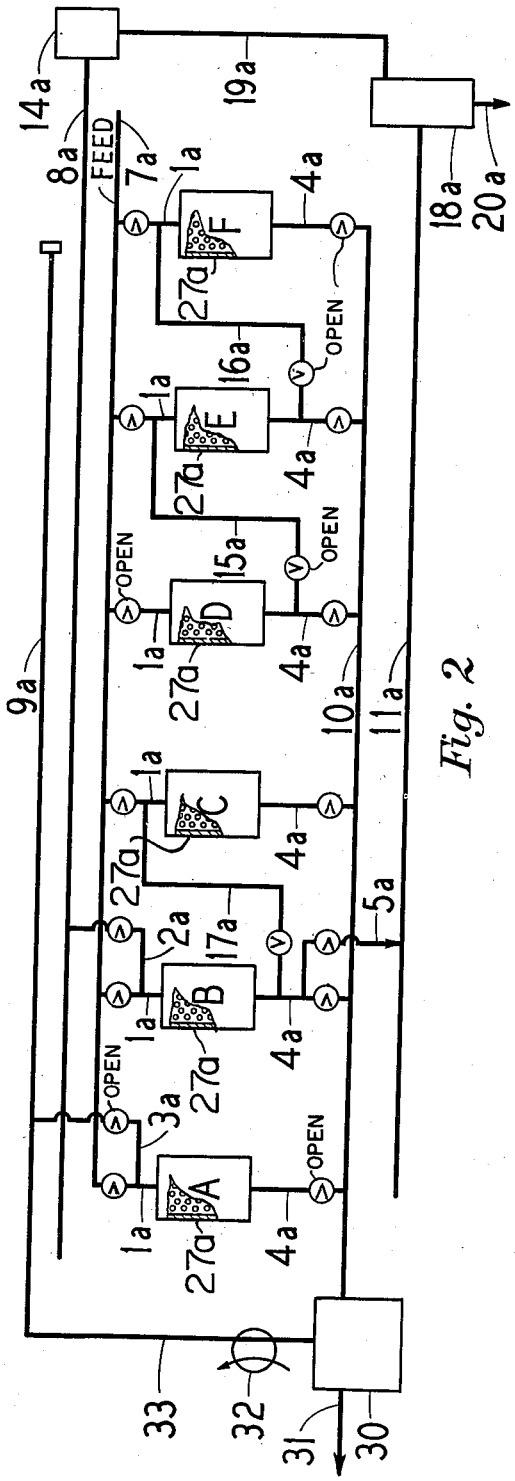
Fig. 2 illustrates the process flow in a modification of the process of the invention in which the mother liquor is employed as the refrigerant.

Figure 2 of the appended drawings illustrates the employment of the mother liquor as the refrigerant. Columns of heat-exchange solid D, E, and F constitute the solidification zone, columns B and C constitute the solid recovery zone and column A constitutes the refrigeration zone. The valves open during the following cycle are marked "open," while the remaining valves are closed. Feed enters column D from manifold line 7a through line 1a and flows through column D and into columns E and F via lines 15a and 16a. Mother liquor is withdrawn from column F through line 4a at column F and flows through manifold line 10a to mother liquor storage tank 30 and net mother liquor is withdrawn from storage tank 30 via line 31 as a product. Part of the mother liquor is cooled for use as the refrigerant by passing through heat exchanger 32. The cold mother liquor then passes through line 33 to refrigerant manifold line 9a and through line 3a at column A into column A, cooling the heat-exchange solid therein and then through line 4a at column A into mother liquor manifold line 10a for return to storage tank 30. The parts labeled with the numbers having the subscript "a" have the same function as the corresponding numbers of Fig. 1, and successive cycles of operation are initiated in the same manner as that described in reference to Fig. 1.

Figure 3:
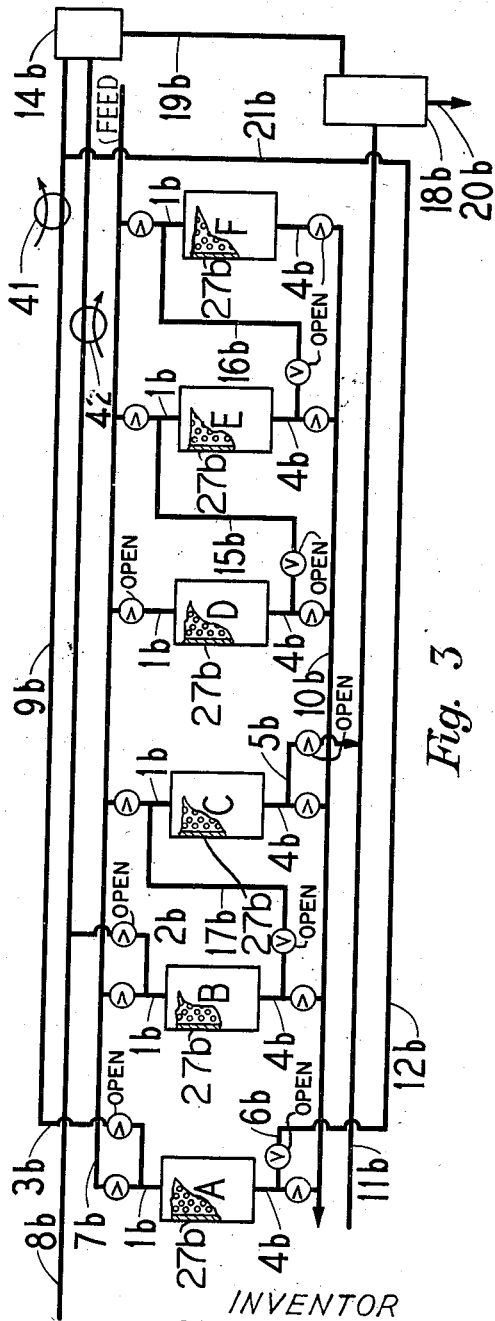
Fig. 3 illustrates a further modification of the process of the invention in which a single fluid is used as both stripping fluid and refrigerant.

In many separations it may be desired to employ a single fluid as both stripping fluid and refrigerant. Where this is done and a liquid is employed, the liquid may be a good low-temperature solvent for the solidified component of the feed and, thus, refrigeration and crystal recovery may be effected in a single step and no separate cooling zone need be maintained. Operation in this manner may be employed in the crystallization of paraxylene from mixed xylenes separated by distillation from catalytically reformed naphtha. Toluene at about −40° F. will dissolve and remove paraxylene crystals from the crystal recovery zone and simultaneously cool the heat-exchange solid sufficiently to permit its use in further separation of paraxylene in the solidification zone directly after the removal of the paraxylene crystals by toluene. No intermediate cooling step is necessary. It may, however, be desired to employ a single fluid at an elevated temperature as a stripping fluid and at a low temperature as a refrigerant. This latter method of utilizing a single fluid as both stripping fluid and refrigerating fluid is illustrated by Fig. 3 of the appended drawings. In Fig. 3, columns D, E, and F constitute the solidification zone, columns B and C the solid recovery zone and column A the refrigeration zone. The parts labeled with the numbers having the subscript "b" correspond to those having the same number in Fig. 1. The flow of liquids during the last part of a cycle after residual liquids from the preceding cycle have been forced out of vessels A, C, and F is indicated in the following description, and the valves open during this cycle are marked "open" and the remaining valves are closed. The feed flows from manifold line 7b through line 1b at column D into column D and then through lines 15b and 16b into columns E and F. Mother liquor is withdrawn from column F through line 4b at column F into manifold line 10b, from which it is removed as a product. The single fluid employed as stripping fluid and refrigerant is stored in tank 14b. Part of it is withdrawn into manifold line 8b through heat exchanger 42 where it is heated. From line 8b the hot fluid passes through valved line 2b into column B, the first column of the solid recovery zone, through line 17b into vessel C, and a mixture of this fluid and liquefied solid is withdrawn from vessel C via line 5b at that vessel. Another part of the single fluid is withdrawn from tank 14b into line 9b through heat exchanger 41 where it is cooled. From line 9b the cold fluid passes through line 3b at column A into column A to cool the heat-exchange material therein. From column A the fluid flows through line 6b into refrigerant return manifold 12b and through line 21b into manifold 9b for recycle through heat exchanger 41. Successive cycles are initiated in the same manner as that described with reference to Fig. 1.

The process as above described may be employed to effect separation of a wide variety of mixtures. The feed is ordinarily introduced in liquid phase; however, a gaseous mixture containing a sublimed solid may be separated, for example, a phthalic anhydride-air mixture. Such mixtures as the following may be separated by the process of the invention: a xylene isomer mixture as obtained by fractionally distilling catalytically reformed naphtha, durene from the distillation bottoms of catalytically reformed naphtha, diesel fuel oil may be dewaxed to reduce pour point, lubricating oil may be dewaxed, slack wax may be deoiled, chlorinated wax may be separated from unchlorinated wax, toluic acid isomers may be separated, cresol isomers may be separated. Numerous other separations may be made; mixtures not readily separable by distillation due to the closeness of the boiling points of the components or to azeotrope formation are frequently separable by fractional solidification and, accordingly, are suitable process feeds.

The stripping fluid may be either gaseous or liquid and is ordinarily introduced into the solid recovery zone at a temperature above the melting point of the crystals or solid particles and thus liquefies them simply by melting. However, with certain feeds a stripping liquid is available which removes the solid particles by solvent action rather than by melting them. With such stripping liquids, solid recovery from, and cooling of, the heat-exchange solid may be simultaneously effected. The stripping fluid is selected to be readily separable from the liquefied solid material either by phase separation or fractional distillation. Separator 18 in Fig. 1 is ordinarily either a gas-liquid separator or a distillation column.

The refrigerating fluid may be either gaseous or liquid and should be either relatively immiscible with, or readily separable from, both the stripping fluid and the unsolidified components of the feed.

By choice of the shape, size, and kind of material for the heat-exchange solid, different heat capacities per unit volume, thermal conductivities, and degrees of inertness with respect to the process fluids may be obtained. Metals such as iron, zinc, lead, aluminum, etc. may be employed. Numerous non-metallic inorganic solids such as quartz, alumina, and coarse sand may also be suitably employed. The heat-exchange solid particles are ordinarily about 20 mesh or larger in size.

In order to maintain the desired relationship, above described, between the length of the composition blur in the partially separated feed and the length of the path of liquid flow through the individual heat-exchange masses, either the length of the path of liquid flow through the mass may be altered or the feed rate may be adjusted. Where a new installation is being made and process conditions, including feed rate, are predetermined, the length of the individual heat-exchange masses is made less than the blur length. Where an existing unit having heat-exchange masses of fixed length is employed to make a variety of separations, then the feed rate is adjusted to produce a composition blur which is longer than the path of liquid flow through the individual heat-exchange mass.

The process of this invention was demonstrated by employing a steel column, 3 inches in diameter by 3 feet, packed with 20 mesh iron shot and cooled below 0° F. by circulation of cold methylethyl ketone. A California lubricating distillate having a 75° F. pour point was diluted with twice its volume of an equal volume mixture of methylethyl ketone and benzene. The resulting mixture was fed into the solidification zone at 50 cc. per minute. The oil recovered from the effluent mother liquor had pour points in the range −10° F. to +15° F.

The present invention has been described in conjunction with preferred embodiments; however, it is to be understood that further variations and modifications may be made without departure from the spirit and scope of the invention, and that such further variations are within the scope of the appended claims.

I claim:

1. In a process of fractional solidification wherein a liquid feed is contacted with a cold mass of particle-form solid heat-exchange material to separate a component of the feed by solidification, the improved cyclic method which comprises maintaining a plurality of substantially uniform masses of heat-exchange material disposed in a solidification zone, a solid recovery zone, and a cooling zone, passing the liquid feed into the solidification zone to solidify the more readily solidifiable components thereof and withdrawing a mother liquor, passing a stripping fluid into the solid recovery zone to liquefy the solid deposited on and engaged by the heat-exchange material therein during previous cycles of operation, and withdrawing the stripping fluid and liquefied solid from said zone, passing a refrigerant fluid through the cooling zone to cool the heat-exchange material therein and initiating successive cycles of operation by regrouping the heat-exchange masses in such manner that those exhausted in the solidification zone, stripped in the solid recovery zone, and cooled in the cooling zone during one cycle are included in the solid recovery zone, the cooling zone, and the solidification zone, respectively, in the succeeding cycle.

2. The process as defined in claim 1 wherein the length of the path of liquid flow through each heat-exchange mass is less than the blur in length.

3. The process as defined in claim 1 wherein the length of the path of liquid flow through each heat-exchange mass is not more than about one-half the length of the blur.

4. A cyclic process for treating fluid mixtures to separate components solidifiable therefrom at reduced temperature which comprises maintaining three groups of serially-connected masses of particle-form heat-exchange material, one group constituting a solidification zone and the heat-exchange solid therein being at a reduced temperature, a second group constituting a solid recovery zone, and the third group constituting a cooling zone, passing a fluid feed into one terminal mass of the solidification zone, separating a component from said feed therein by solidification and withdrawing a mother-liquor from the other terminal mass of the solidification zone, passing a stripping fluid into one terminal mass of the solid recovery zone to liquefy the solid deposited therein in previous cycles of operation and withdrawing said liquefied solid and stripping fluid from the solid recovery zone, passing a fluid refrigerant into one terminal mass of the cooling zone, cooling the heat-exchange solid therein and withdrawing the refrigerant from the other terminal mass of the cooling zone, initiating successive cycles of operation by moving all points of fluid introduction and withdrawal in the several masses of each zone to the next serially-connected mass in the direction of flow in each zone and regrouping the masses in such manner that the terminal masses of the solidification zone, solid recovery zone, and cooling zone into which fluid is introduced in one cycle become the terminal masses from which fluid is withdrawn in the solid recovery zone, cooling zone, and solidification zone, respectively, in the next succeeding cycle.

5. The process as defined in claim 4 wherein the length of the path of liquid flow through each mass of heat-exchange material is less than the blur in length.

6. The process as defined in claim 4 wherein the length of the path of liquid flow through each mass of heat-exchange material is not more than about one-half the length of the blur.

7. In a process of fractional solidification wherein a liquid feed is contacted with a cold mass of particle-form solid heat-exchange material to separate a component of the feed by fractional solidification, the improved method which comprises maintaining a plurality of substantially uniform heat-exchange masses in serial interconnection to constitute a solidification zone, passing the feed into one terminal mass of the solidification zone to solidify the more readily solidifiable components of the feed, withdrawing a mother liquor from the other terminal mass of the solidification zone, and adjusting the rate at which the feed is introduced into the solidification zone to produce a composition blur in the solidification zone having a length greater than the length of the path of liquid flow through the individual heat-exchange masses constituting said zone.

8. In a process of fractional solidification wherein a liquid feed is contacted with a cold mass of particle-form solid heat-exchange material to separate a component of the feed by fractional solidification, the improved method which comprises maintaining a plurality of substantially uniform heat-exchange masses in serial interconnection to constitute a solidification zone, passing the feed into one terminal mass of the solidification zone to solidify the more readily solidifiable components of the feed, withdrawing a mother liquor from the other terminal mass of the solidification zone, and adjusting the rate at which the feed is introduced into the solidification zone to produce a composition blur in the solidification zone having a length greater than the length of the path of liquid flow through the individual heat-exchange masses constituting said zone.

9. In a process of fractional solidification wherein a fluid feed is contacted with a cold mass of particle-form solid heat-exchange material to separate a component of the feed by fractional solidification, the improved method which comprises maintaining a plurality of substantially uniform heat-exchange masses in serial interconnection to constitute a solidification zone, passing the feed into one terminal mass of said zone to solidify the more readily solidifiable components of the feed, withdrawing a mother liquor from the other terminal mass of said zone, adjusting the feed rate to the solidification zone to produce a composition blur in said zone such that the path of liquid flow through each individual heat-exchange mass in said zone is a fraction of the blur length, said fraction being approximately equal to the reciprocal of an integer, and providing a total number of heat-exchange masses in the solidification zone such that said total number exceeds the number of masses required to contain the entire blur in said zone by at least one.

CLARK J. EGAN.

REFERENCES CITED

The following references are of record in the file of this patent:

UNITED STATES PATENTS

| Number | Name | Date |
|---|---|---|
| 633,207 | Miles | Sept. 19, 1899 |
| 919,616 | Monti | Apr. 27, 1909 |
| 2,439,434 | Lindgren | Apr. 13, 1948 |
| 2,526,996 | Crawford | Oct. 24, 1950 |
| 2,537,046 | Garbo | Jan. 9, 1951 |